J. J. DONOVAN ET AL
July 7, 1931. AWNING TYPE WINDOW Re. 18,125
Original Filed Aug. 1, 1928 2 Sheets-Sheet 1
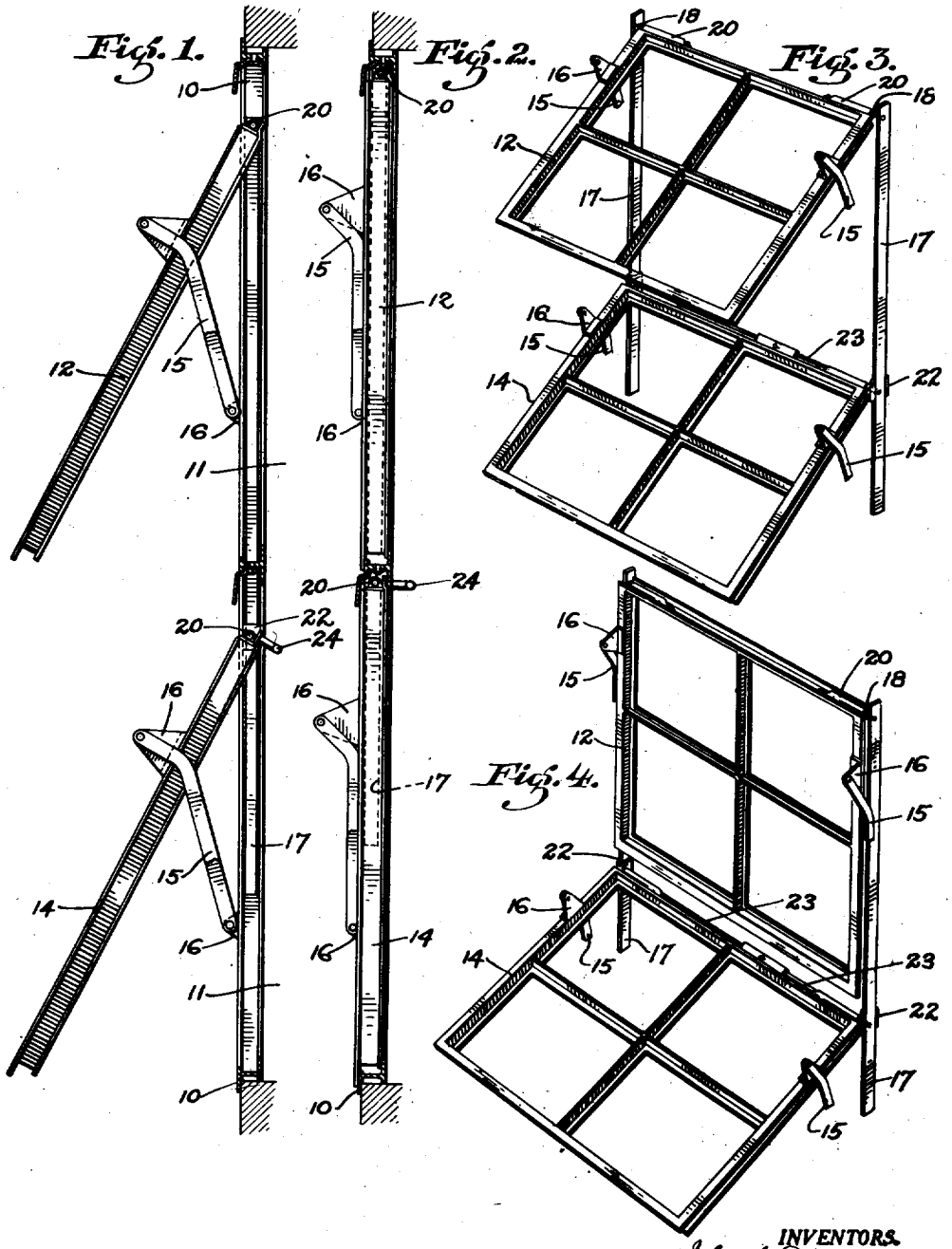
INVENTORS.
John J. Donovan,
Esmond F. Wiley.
BY
Drummond, Lofters & Ofhett
ATTORNEYS.

J. J. DONOVAN ET AL

July 7, 1931.

AWNING TYPE WINDOW

Re. 18,125

Original Filed Aug. 1, 1928

2 Sheets-Sheet 2

INVENTORS.
John J. Donovan,
Edmond F. Wiley.
BY Townsend, Lofton & Hitt
ATTORNEYS.

Reissued July 7, 1931 Re. 18,125

UNITED STATES PATENT OFFICE

JOHN J. DONOVAN, OF OAKLAND, AND ESMOND F. WILEY, OF SAN FRANCISCO, CALIFORNIA

AWNING TYPE WINDOW

Original No. 1,776,620, dated September 23, 1930, Serial No. 296,676, filed August 1, 1928. Application for reissue filed January 19, 1931. Serial No. 509,813.

This invention relates to awning type windows.

Hitherto, awning type windows have been manufactured which include a series of swinging sashes pivotally and slidably mounted in a frame for operation. The pivotal and sliding connections include a pair of fulcrum links for each sash which are pivoted intermediate the ends of the sashes and to the frame, and sliding shoes fitted to the upper ends of the sashes and slidably engaging trackways formed in the jambs of the frame. In order that the sashes may be independently operated the upper ends of the sashes are connected together by a connecting member arranged vertically intermediate the sashes and the jamb. This connecting member is capable of operation to disconnect the sashes so that they may be operated independently, As the fulcrum links and the connecting member are arranged between the sashes and the jamb and as the connecting member requires a certain amount of clearance for operation, it was necessary that the frame be of considerable depth. In wood construction there is ample space for these elements and such construction results in an ideal arrangement for windows of this type but when endeavoring to convert these windows into all steel construction the steel frame must be of a design substantially the same in dimensions as the wood type frame. Therefore, these all steel windows were very expensive to manufacture, extremely heavy and not at all suited for their purpose.

It is the principal object of the present invention to provide a comparatively inexpensive awning type window operating as above set forth which can be incorporated into a steel frame of simple design and of minimum dimensions.

One form which the invention may assume is exemplified in the following description and illustrated by way of example in the accompanying drawings, in which:

Fig. 1 is a central vertical section through a window structure embodying the preferred form of my invention and disclosing the sashes in open position.

Fig. 2 is a similar section with the sashes in closed position.

Fig. 3 is a perspective view of the sashes and their operating mechanism disclosing the sashes in open position.

Fig. 4 is a similar view showing one sash closed and one in open position.

Figure 5:
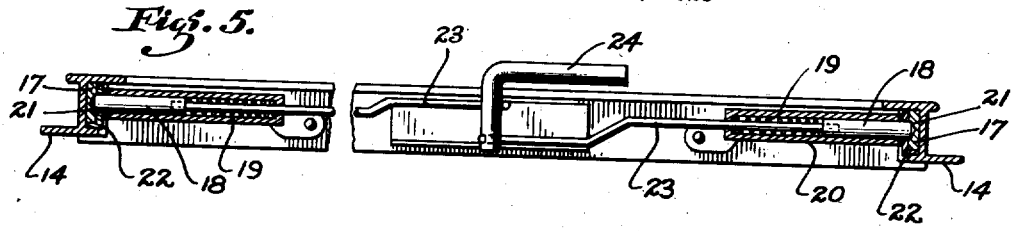
Fig. 5 is a view in transverse section through the window taken just above the top rail of the lower sash.
Figure 6:
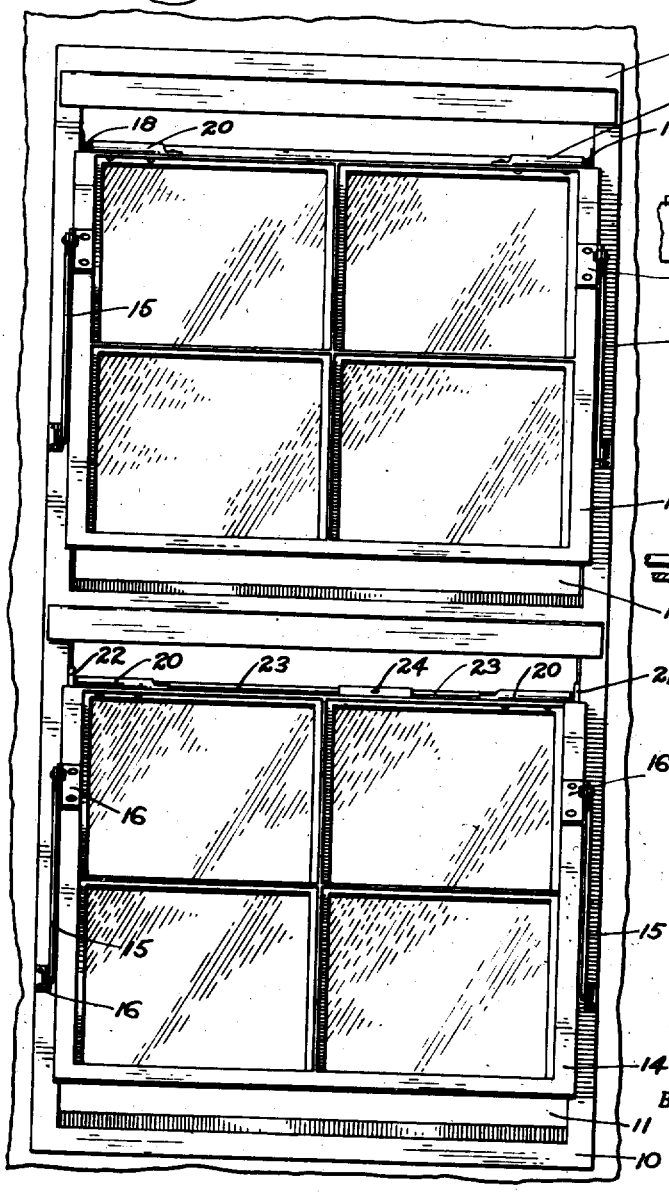
Fig. 6 is a front elevation of a window embodying my invention disclosing the sashes in open position.
Figure 7:
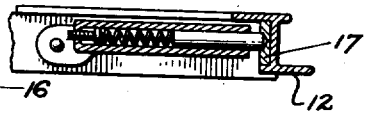
Fig. 7 is a fragmentary view in section disclosing the connection between the upper sash and the travelling bar at one side of the window.
Figure 8:
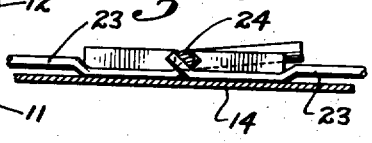
Fig. 8 is a fragmentary view in section showing the operating mechanism for disconnecting the lower sash from the travelling bars.
Figure 9:
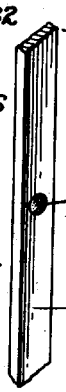
Fig. 9 is a fragmentary view in perspective of one of the travelling bars showing the recess therein.
Figure 10:
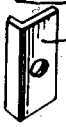
Fig. 10 is a perspective view of one of the shoes carried by the lower sash.

Referring more particularly to the accompanying drawings 10 indicates a window frame of suitable dimensions and construction. This frame is formed of bars of channeled material as illustrated in the drawings. This material is of a standard shape and stock and is principally used in the manufacture of window frames for factories, schools and other buildings using metallic trim. Windows having frames constructed of this material are durable, comparatively inexpensive and have a maximum area of glass.

The frame 10 is formed with two sash openings 11 within which sashes 12 and 14 are mounted for swinging movement in a vertical plane. Each sash is connected with the frame by a pair of fulcrum links 15. These fulcrum links are disposed exteriorly of the window as illustrated and are pivotally connected at their lower ends to lugs 16 permanently fixed on the exterior face of the jambs of the frame.

It will be noticed that the links 15 of each sash are arranged upon opposite sides thereof and in horizontal alignment. The upper ends of the fulcrum links 15 are pivotally connected to the sides of the sash at a point intermediate the ends of the latter. The point of connection between the links 15 and the sash is spaced further from the face of the frame 10 than the point of connection between the links and the frame. This arrangement of the pivotal points of the fulcrum links causes the sashes to tightly close and remain so when the sashes are drawn to closed position.

The upper end of each sash is pivotally and slidably connected to the jambs of the frame so that the sashes will pivot about their upper ends in a vertical plane as illustrated in Fig. 1 of the drawings. Included in the pivotal connections between the sashes and the jambs of the frame is a pair of travelling or actuating bars 17 disposed one adjacent each jamb and nested within the channeled portion thereof intermediate the sash and the jamb. The upper sash is fitted at its top rail with a pair of outwardly projecting connectors 18 which are constantly urged outwardly by springs 19.

The connectors 18 and springs 19 are housed within barrels 20 suitably secured to the upper rail of the sash. These connectors 18 project beyond the sides of the sash and engage sockets 21 formed in the inner surfaces of the travelling bars 17. The connection between the upper sash and these travelling bars forms a pivotal and sliding connection between the upper end of the upper sash and the jambs of the frame, enabling operation of the upper sash as the travelling bars 17 may reciprocate in the channeled jambs.

It is desired to point out that the springs 19 which tend to press the connectors 18 outwardly cause a certain amount of friction between the travelling bars 17 and the jambs of the frame so that the sashes will remain in any set position, but may be operated easily.

The connection between the top rail of the lower sash and the travelling bars 17 is similar to that just described with the exception that sliding mountings or shoes 22 are slidably interfitted or arranged on the connectors or bolts 18 intermediate the travelling bars 17 and the sides of the sash. Also the connectors or bolts 18 of the lower sash are connected by means of operating rods 23 to an operating member 24 which is capable of operation to withdraw the connectors or bolts 18 from engagement with the sockets 21 in the travelling bars 17. The movement of the connectors 18 is limited, however, so that they cannot be withdrawn from the shoes 22. Thus, when the connectors 18 are withdrawn from engagement with the sockets 21 in the travelling bars 17 a sliding and pivotal connection will be established between the upper end of the lower sash and the lower ends of the travelling bars 17, so that the sashes may be operated independently of each other.

It will be noticed that the travelling bars 17 extend a considerable distance below the point of connection between them and the lower sash so that ample guide means will be provided for the lower sash when it is operated independently of the upper one.

In operation of the window, it is constructed and assembled as illustrated in the drawings with both sashes operatively connected to the travelling bars 17. To open the windows it is only necessary to grasp the lower rail of either of them and press outwardly, causing the windows to open as illustrated in Fig. 1. As the travelling bars 17 bear against the jambs with a certain amount of friction, the windows will remain in any set position whether opened or closed.

The disposition of the pivotal points of the fulcrum links 15 upon which the sashes are suspended will cause the sashes to tightly close when they are drawn to this position.

To operate the sashes independently it is only necessary to operate the member 24 to withdraw the connectors 18 from engagement with the sockets 21 in the travelling bars 17. Either sash may then be operated independently of the other. As soon as the operating member 24 is released and the connectors 18 of the lower sash aligned or registered with the sockets 21 on the travelling bars 17, they will re-engage these sockets and connect the sashes together.

It is desired to point out here that although two sashes are shown in the present instance, it should be understood that a greater number of sashes may be arranged in a single frame if desired and still be operated by means of the mechanism here disclosed.

Particular attention is directed to the fact that the depth of the frame is no greater than the depth of the sash rails themselves, and that the operating mechanism with the exception of the fulcrum links 15 is all concealed, when the sashes are closed.

Also, the frame is constructed of standard material and the operating mechanism is so designed that it will be inexpensive to construct, enabling the window to be produced at a figure far less than awning type windows of present day construction.

While the preferred form of the invention has been here disclosed, it is to be understood that various changes may be made in its construction by those skilled in the art without departing from the spirit of the invention as defined in the appended claims.

Having thus described our invention, what we claim and desire to secure by Letters Patent is:

1. A window of the character described comprising a frame and having jambs, the inner face of each jamb being formed with a vertical channel, a plurality of sashes mounted in the frame, a travelling bar guided for vertical reciprocation in the channel of each jamb, pivotal connections between the sashes and the travelling bars, said pivotal connections yieldingly pressing the travelling bars into frictional contact with the sides of the frame whereby the sashes will remain in set position, and fulcrum links connected to the frame and to the sashes to cooperate with the traveling bars in enabling the sashes to swing in a vertical plane.

2. A window of the character described comprising a frame of metallic construction having jambs channeled in cross-section, the cross-sectional shape of the jambs providing a vertical channel in the inner face of each jamb, a travelling bar arranged in the channel of each jamb and guided therein for vertical reciprocation, sashes mounted in the frame and pivotally connected at one end to the travelling bars, and fulcrum links connected at one end to the frame and at the other end to the sashes at a point intermediate the ends of the latter.

3. A window of the character described comprising a frame having jambs, the inner face of each jamb being formed with a vertical channel, a travelling bar lying in the channel of each jamb and guided therein for vertical reciprocation, sashes mounted in the frame and pivotally connected at one end to the travelling bars, said pivotal connections yieldingly pressing the travelling bars into frictional contact with the jambs whereby the sashes will remain in a set position, and fulcrum links connected at one end to the frame and at the other end to the sashes at a point intermediate the ends of the latter.

4. A window of the character described comprising a frame having jambs: the inner face of each jamb being formed with a vertical channel, sashes mounted in the frame, vertically reciprocable travelling bars disposed in the channels of the jambs and guided therein for vertical reciprocation, pivotal connections between the upper ends of the sashes and the travelling bars, pivotal connections between one sash and the travelling bars being capable of operation to disengage from the bars and slidably and pivotally connect the sash to the bars, fulcrum links pivotally connected to the frame and to the sashes.

5. A window of the character described comprising a frame having jambs, the inner face of each jamb being formed with a vertical channel in alignment with the sash, sashes mounted in the frame, vertically reciprocable travelling bars arranged in the channels of the jambs and guided therein for vertical reciprocation, pivotal connections between the upper ends of the sashes and the travelling bars, pivotal connections between one sash and the travelling bars being capable of operation to disengage from the bars and slidably and pivotally connect the sash to the bars, fulcrum links pivotally connected to the frame and to the sashes, said pivotal connections yieldably pressing the travelling bars into frictional contact with the jambs whereby the sashes will remain in a set position.

6. A window of the character described comprising a frame having the usual jambs, sashes mounted in the frame, vertically reciprocable traveling bars arranged between the sides of the sashes and the jambs and guided for vertical reciprocation, a pivotal connection between the upper end of one sash and the travelling bars, sliding shoes mounted on the travelling bars in alignment with the upper end of the other sash, pivotal connections between the upper end of the latter sash and said shoes and the travelling bars, said pivotal connections being operative to disengage from the travelling bars whereby the shoes may reciprocate on the travelling bars and the sash pivoted relative to the shoes, and fulcrum links connected to the frame and to the sashes.

7. A window of the character described comprising a frame having the usual jambs, sashes mounted in the frame, vertically reciprocable travelling bars arranged between the sides of the sashes and the jambs and guided for vertical reciprocation, a pivotal connection between the upper end of one sash and the travelling bars, sliding shoes mounted on the travelling bars in alignment with the upper end of the other sash, pivotal connections between the upper end of the latter sash and said shoes and the travelling bars, said pivotal connections being operative to disengage from the travelling bars whereby the shoes may reciprocate on the travelling bars and the sash pivoted relative to the shoes, and fulcrum links connected to the frame and to the sashes, said pivotal connections yieldingly pressing the travelling bars into frictional contact with the jambs whereby the sashes will remain in a set position.

8. The combination with a window frame, of a plurality of sashes mounted in said frame to swing, an actuating bar mounted to reciprocate in the window frame, a connection between one of the sashes and the bar that causes the swinging of the sash on the reciprocation of the bar, and a bolt movably mounted on the other sash and detachably engaging with the bar to effect its movement with the latter sash and to permit the independent movement of said latter sash.

9. The combination with a window frame, of a plurality of sashes mounted in said frame to swing, an actuating bar mounted to reciprocate in the window frame, a connection between one of the sashes and the bar that causes the swinging of the sash on the reciprocation of the bar, and a device mounted on the other sash and having a detachable pivotal engagement in the bar and a slidable interfitted mounting on said bar that is operative when the pivotal engagement is detached.

10. The combination with a window frame, of a plurality of sashes, links pivoted to the frame and to the sashes, reciprocatory actuating bars at the sides of the frame, a pivotal mounting for one sash on the said bars, and a bolt structure mounted on the other sash and having detachable pivotal mountings on the bars and mountings that are slidably interfitted with the bars when the pivotal mountings are disengaged.

11. The combination with a window-frame, of guideways at the opposite sides of the frame, actuating bars mounted to reciprocate in the guideways, upper and lower sashes, connections between the sashes and the frame that permit the sash to swing, pivotal connections between one sash and the bars to cause its swinging movement on the reciprocation of the bars, sliders on the bars adjacent the other sash, and bolts on said other sash that slidably pass through the sliders and detachably interlock with the bars, said bolts when detached from the bars, maintaining their engagements with the sliders and causing the sliding movements of the sliders on the bars when the sash is swung.

JOHN J. DONOVAN.
ESMOND F. WILEY.